United States Patent [19]
Lee

[11] Patent Number: 5,731,852
[45] Date of Patent: Mar. 24, 1998

[54] IMAGE/AUDIO INFORMATION RECORDING AND REPRODUCING APPARATUS USING A SEMICONDUCTOR MEMORY

[75] Inventor: Young-man Lee, Suwon, Rep. of Korea

[73] Assignee: Samsung Electronics Co., Ltd., Kyungki-do, Rep. of Korea

[21] Appl. No.: 585,929

[22] Filed: Jan. 16, 1996

[30] Foreign Application Priority Data

Jan. 16, 1995 [KR] Rep. of Korea ............ 95-646

[51] Int. Cl.⁶ .................................. H04N 5/907
[52] U.S. Cl. ................ 348/719; 348/232; 348/233; 348/515; 386/91; 386/96
[58] Field of Search ................ 348/232, 233, 348/515, 518, 718, 714, 719; 386/75, 96, 104, 90, 91; H01N 5/907

[56] References Cited

U.S. PATENT DOCUMENTS

| 4,851,909 | 7/1989 | Noske et al. | 386/104 |
| 5,032,918 | 7/1991 | Ota et al. | 348/334 |
| 5,032,927 | 7/1991 | Watanabe et al. | 386/104 |
| 5,384,674 | 1/1995 | Nishida et al. | 386/96 |
| 5,510,858 | 4/1996 | Shido et al. | 348/714 |
| 5,583,791 | 12/1996 | Harigaya et al. | 348/575 |

FOREIGN PATENT DOCUMENTS

93-5598  6/1993  Rep. of Korea ............ H04N 5/225

*Primary Examiner*—John K. Peng
*Assistant Examiner*—Jeffrey A. Murrell
*Attorney, Agent, or Firm*—Sughrue, Mion, Zinn, Macpeak & Seas, PLLC

[57] ABSTRACT

An image/audio information recording and reproducing apparatus using a semiconductor memory. The image/audio information recording and reproducing apparatus includes a semiconductor memory, a signal processor for processing image and audio information so that the image and audio information can be recorded on and reproduced from the semiconductor memory, and a control portion coupled between the semiconductor memory and the signal processor, for storing individual image information and individual audio information corresponding to the individual image information in the semiconductor memory and reading the stored image and audio information from the semiconductor memory, using a start address of the individual information and both a start address and an end address of the individual audio information.

13 Claims, 7 Drawing Sheets

FIG. 2A
(PRIOR ART)

|  | IMAGE DESIGNATION | IMAGE INFORMATION | AUDIO INFORMATION |
|---|---|---|---|
|  | A7 A6 A5 A4 | A3 A2 A1 A0 | C1 C0 |
| IMAGE #1 | 0 0 0 0 | 0F 0F 0F 0F | 0F 0F |
| IMAGE #2 | 0 0 0 1 | 0F 0F 0F 0F | 0F 0F |
| IMAGE #3 | 0 0 1 0 | 0F 0F 0F 0F | 0F 0F |
| IMAGE #4 | 0 0 1 1 | 0F 0F 0F 0F | 0F 0F |
| IMAGE #5 | 0 1 0 0 | 0F 0F 0F 0F | 0F 0F |
| IMAGE #6 | 0 1 0 1 | 0F 0F 0F 0F | 0F 0F |
| IMAGE #7 | 0 1 1 0 | 0F 0F 0F 0F | 0F 0F |
| IMAGE #8 | 0 1 1 1 | 0F 0F 0F 0F | 0F 0F |
| IMAGE #9 | 1 0 0 0 | 0F 0F 0F 0F | 0F 0F |
| IMAGE #10 | 1 0 0 1 | 0F 0F 0F 0F | 0F 0F |
| IMAGE #11 | 1 0 1 0 | 0F 0F 0F 0F | 0F 0F |
| IMAGE #12 | 1 0 1 1 | 0F 0F 0F 0F | 0F 0F |
| IMAGE #13 | 1 1 0 0 | 0F 0F 0F 0F | 0F 0F |
| IMAGE #14 | 1 1 0 1 | 0F 0F 0F 0F | 0F 0F |
| IMAGE #15 | 1 1 1 0 | 0F 0F 0F 0F | 0F 0F |
| IMAGE #16 | 1 1 1 1 | 0F 0F 0F 0F | 0F 0F |

IMAGE/AUDIO INFORMATION RECORDING AND REPRODUCING APPARATUS USING A SEMICONDUCTOR MEMORY

BACKGROUND OF THE INVENTION

The present invention relates to an image/audio information recording and reproducing apparatus using a semiconductor memory, and more particularly, to an apparatus for recording/reproducing image and audio information on a number of still images or successive moving images in a semiconductor memory having a predetermined memory capacity for respective image information.

U.S. Pat. No. 5,170,388 discloses technology of recording audio information corresponding to image information which is recorded on a dynamic recording medium such as a magnetic tape and on a static recording medium such as an electronically erasable and programmable ROM (EEPROM). In this patent, the audio information corresponding to the image information is recorded on a static recording medium according to an address signal which is recorded on a dynamic recording medium together with the image information, and is read out from the static recording medium.

Figure 2A:
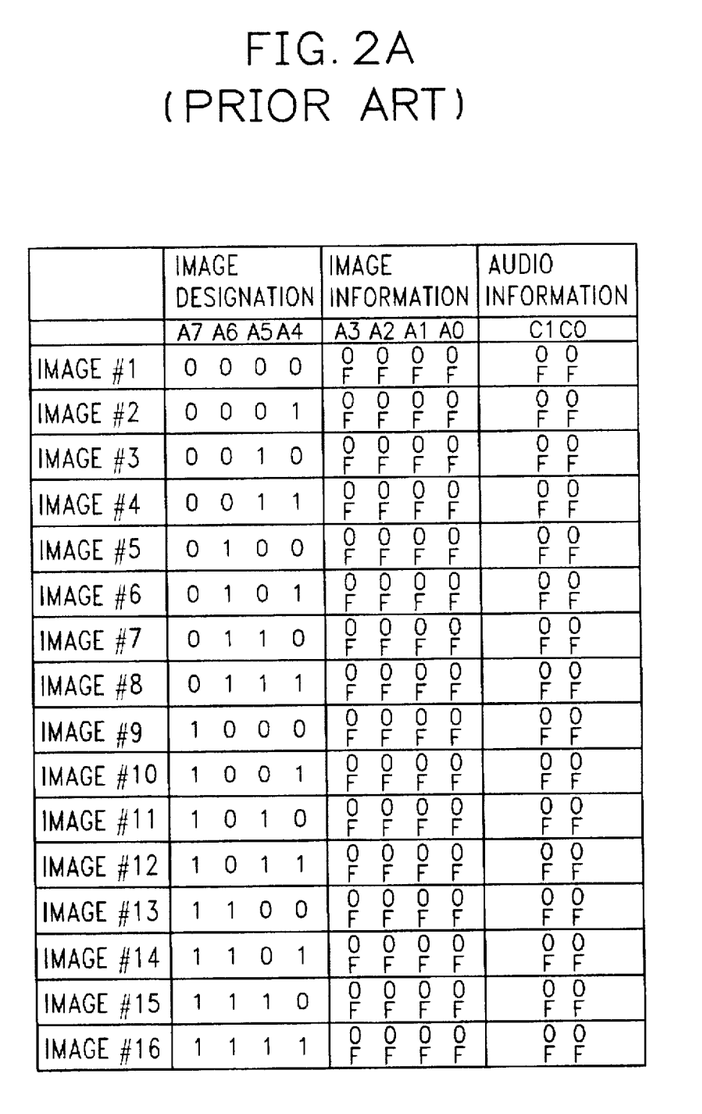
FIGS. 2A and 2B are views for explaining memory allocation of a conventional IC card type semiconductor memory.
Figure 2B:
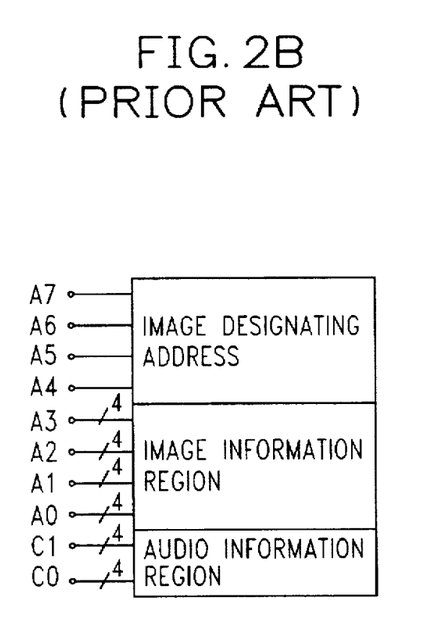

Korean patent publication No. 93-5598 published on Jun. 23, 1993 discloses prior art technology of recording image information and audio information corresponding to the image information in a semiconductor memory. A digital still picture camera referred to in this reference uses a semiconductor memory of an integrated circuit, (IC) card type in place of a general camera film, to record both the image information and the audio information corresponding to the still image on the semiconductor memory. An address allocation for recording the still image information and the audio information thereon is shown in FIG. 2A. FIG. 2A shows an example of the address allocation of the semiconductor memory for the image and audio information corresponding to sixteen still images. FIG. 2B shows a region allocation and an address bus in an IC card type of semiconductor memory. In FIGS. 2A and 2B, address signals A7, A6, A5 and A4 are a one-bit address for image designation, respectively. That is, "A7A6A5A4" is a four-bit address. Address signals A3, A2, A1 and A0 are a four-bit address for image information, respectively. That is, "A3A2A1A0" is a sixteen-bit address. Address signals C1 and C0 are a four-bit address for audio information, respectively. That is, "C1C0" is an eight-bit address. Thus, if a still image #1 is selected, the image designation address "A7A6A5A4" is "0000," the image information is stored in or read out from an address between "0000" and "FFFF" and the audio information is stored in or read out from an address between "00" and "FF." Therefore, the image and audio information corresponding to each still image is recorded in a respectively corresponding region having a predetermined capacity. Accordingly, when an amount of data of the audio information corresponding to a particular still image exceeds the predetermined capacity, such audio information cannot be properly stored in a semiconductor memory.

SUMMARY OF THE INVENTION

Therefore, to solve the above problem, it is an object of the present invention to provide an image/audio information recording and reproducing apparatus which can vary the size of a storage region for audio information corresponding to image information according to an amount of actual data of the audio information.

To accomplish the above object of the present invention, there is provided an image/audio information recording and reproducing apparatus using a semiconductor memory, the image/audio information recording and reproducing apparatus comprising:

a semiconductor memory;

a signal processing portion for processing image and audio information so that the image and audio information can be recorded on and reproduced from the semiconductor memory; and a controller, coupled between the semiconductor memory and the signal processing portion, for storing individual image information and individual audio information corresponding to the individual image information in the semiconductor memory and reading the stored image and audio information from the semiconductor memory, using a start address of the individual information and both a start address and an end address of the individual audio information.

Preferably, the semiconductor memory comprises a region for storing the image information, a region for storing the audio information, and a region for storing an image information start address, an audio information start address and an audio information end address corresponding to the individual image information.

Preferably, the controller determines a start address and an end address of the individual audio information which is stored in the semiconductor memory, on the basis of an amount of the audio data corresponding to one between a recording start command and a recording stop command according to a user's instruction.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings.

Figure 1:
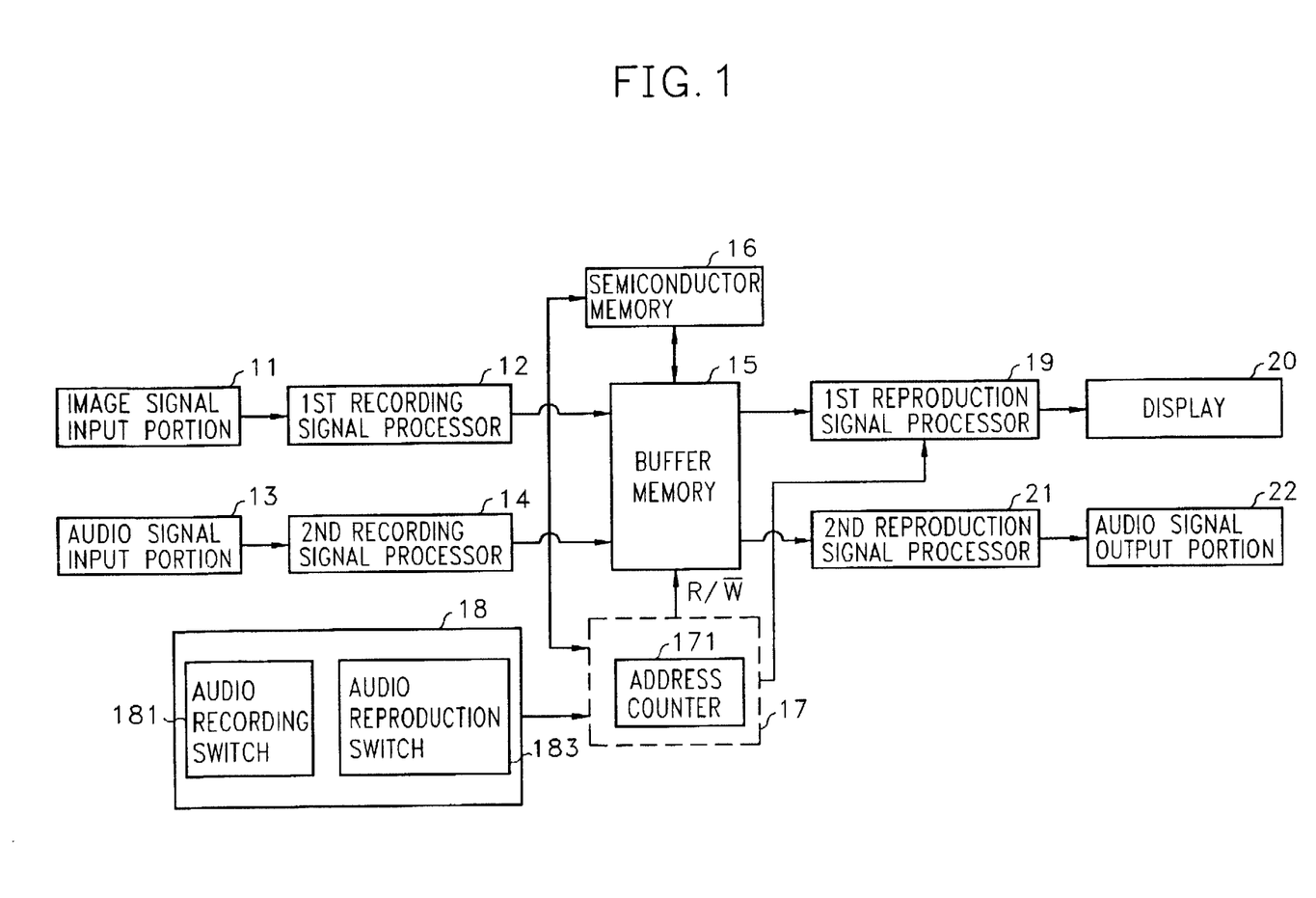
FIG. 1 is a block diagram showing an apparatus for recording/reproducing image/audio information on and from a semiconductor memory according to a preferred embodiment of the present invention.

The FIG. 1 apparatus according to a preferred embodiment of the present invention picks up a signal of an object to be photographed and records an audio signal accompanying the picked-up signal. The image information and the audio information corresponding to the image information is stored in semiconductor memory 16, and the stored information is read out from semiconductor memory 16. Semiconductor memory 16 can be attached to or detached from the FIG. 1 apparatus in the form of the IC card.

When the FIG. 1 apparatus operates, an image signal input portion 11 having a charge coupled device (CCD) solid-state pickup element (not shown) for converting an optical image signal into an electrical image signal and a lens (not shown) for focusing an image of an object on the solid-state pickup element, supplies the electrical image signal obtained by a photoelectric conversion to a first recording signal processor 12. First recording signal processor 12 processes the applied electrical image signal in the recordable form and supplies the processed result to a buffer memory 15. Meanwhile, an audio signal input portion 13 having a microphone (not shown) converts an acoustic audio signal into an electrical audio signal and supplies the converted signal to a second recording signal processor 14. Second recording signal processor 14 processes the applied electrical audio signal in the recordable form and supplies the processed result to buffer memory 15. Buffer memory 15 supplies the applied data to reproduction signal processors 19 and 21 or semiconductor memory 16, and stores the data supplied from semiconductor memory 16, according to a read/write control signal R/W output from a system controller 17. Semiconductor memory 16 and buffer memory 15 give and take the data to and from each other under the control of system controller 17. First reproduction signal processor 19 reproducibly processes the image data supplied from buffer memory 15 and supplies the processed result to a display 20. Second reproduction signal processor 21 reproducibly processes the audio data supplied from buffer memory 15 and supplies the processed result to an audio signal output portion 22 such as a speaker or a head-phone.

Figure 5:
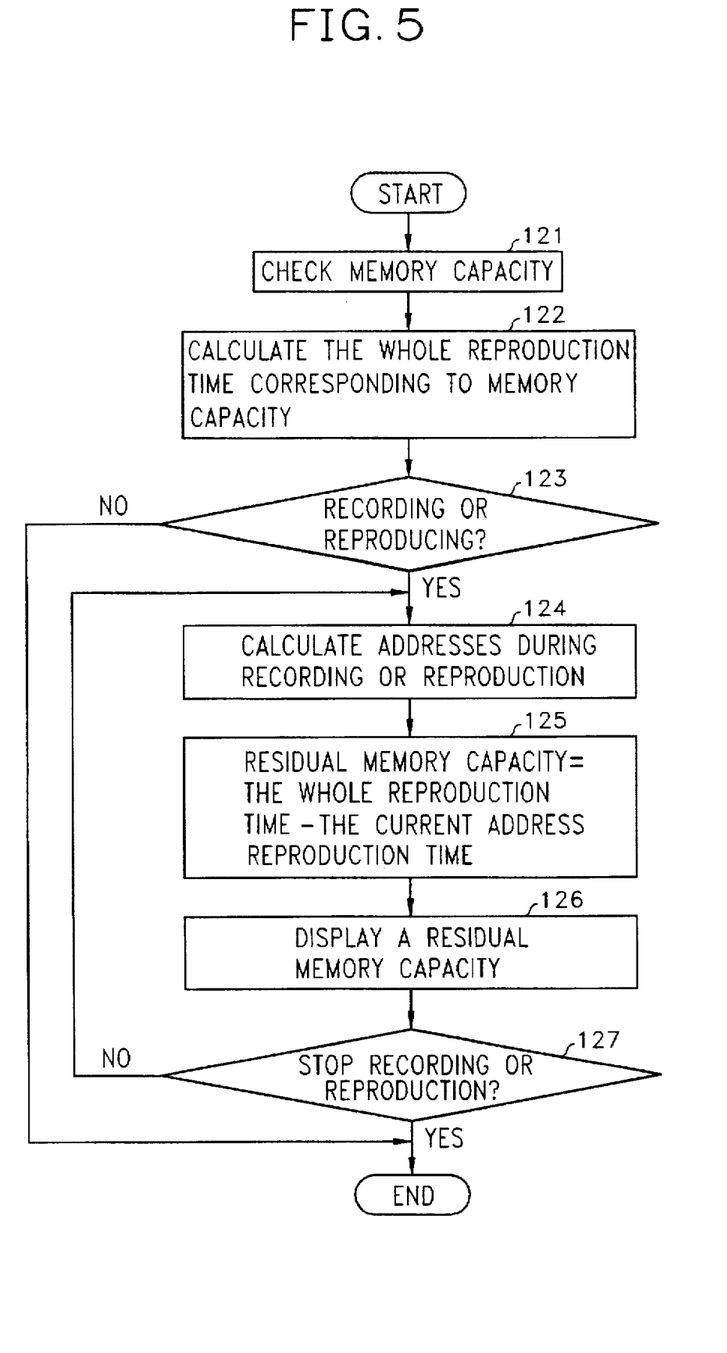
FIG. 5 is a flowchart diagram for explaining a procedure of displaying a remainder of the memory capacity in the IC card type semiconductor memory shown in FIG. 1.

System controller 17 judges whether the IC card semiconductor memory 16 is attached to the image/audio information recording and reproducing apparatus and checks a current memory residual capacity of semiconductor memory 16 according to a method to be described later with reference to FIG. 5. System controller 17 controls semiconductor 16 to store or read the image data or the audio data. Particularly, system controller 17 performs a control operation of starting or stopping of recording/reproducing of the audio data in/from semiconductor memory 16 according to a command from a switch portion 18. Switch portion 18 includes switches 181 and 183 for instructing system controller 17 to record or reproduce the audio information on or from buffer memory 15.

Figure 2C:
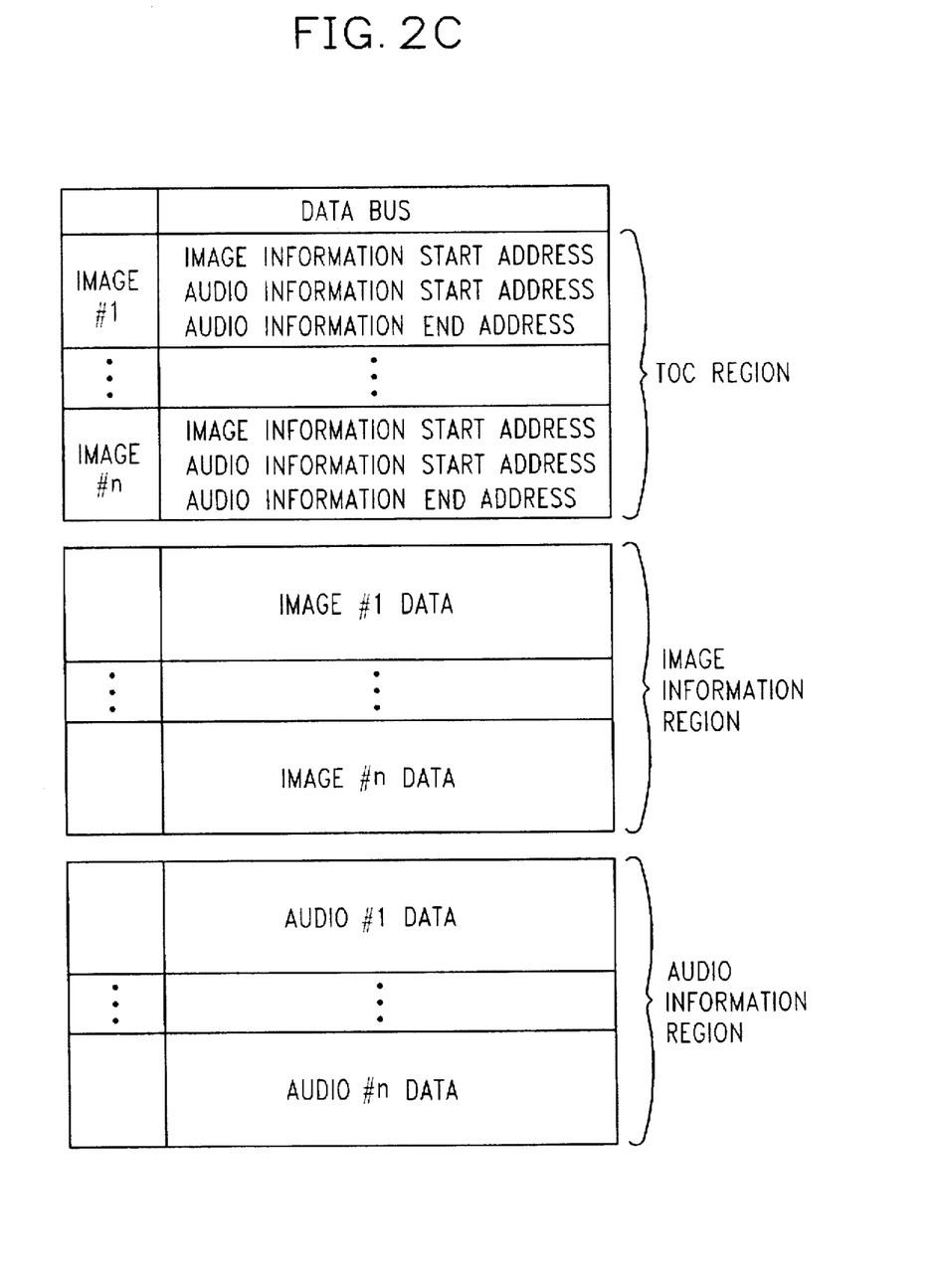
FIG. 2C is a view for explaining memory allocation of an IC card type semiconductor memory according to the present invention.

Prior to describing an operation of the FIG. 1 apparatus having the above-described construction, a region allocation of semiconductor memory 16 will be described with reference to FIG. 2C.

The image information start address for the individual image information, and the start and end addresses of the audio information corresponding to the individual image information are stored in a table-of-contents (TOC) region in semiconductor memory 16. The individual image information is stored in a region of a predetermined magnitude within an image information region which is designated by the image information start address corresponding to the individual image information. The individual audio information is stored in a region of a variable magnitude within an audio information region which is designated by the audio information start and end addresses corresponding to the individual audio information. In this manner, semiconductor memory 16 stores therein the image information for the N still images and the audio information corresponding to the individual image information. Therefore, a magnitude of each region in the image information region designated by the image information start address can be changed into a form capable of storing the image information for the successive moving images therein.

The storage and readout of the audio information corresponding to the individual image information with respect to semiconductor memory 16 having the above regions will be described with reference to FIGS. 3 and 4.

Figure 3:
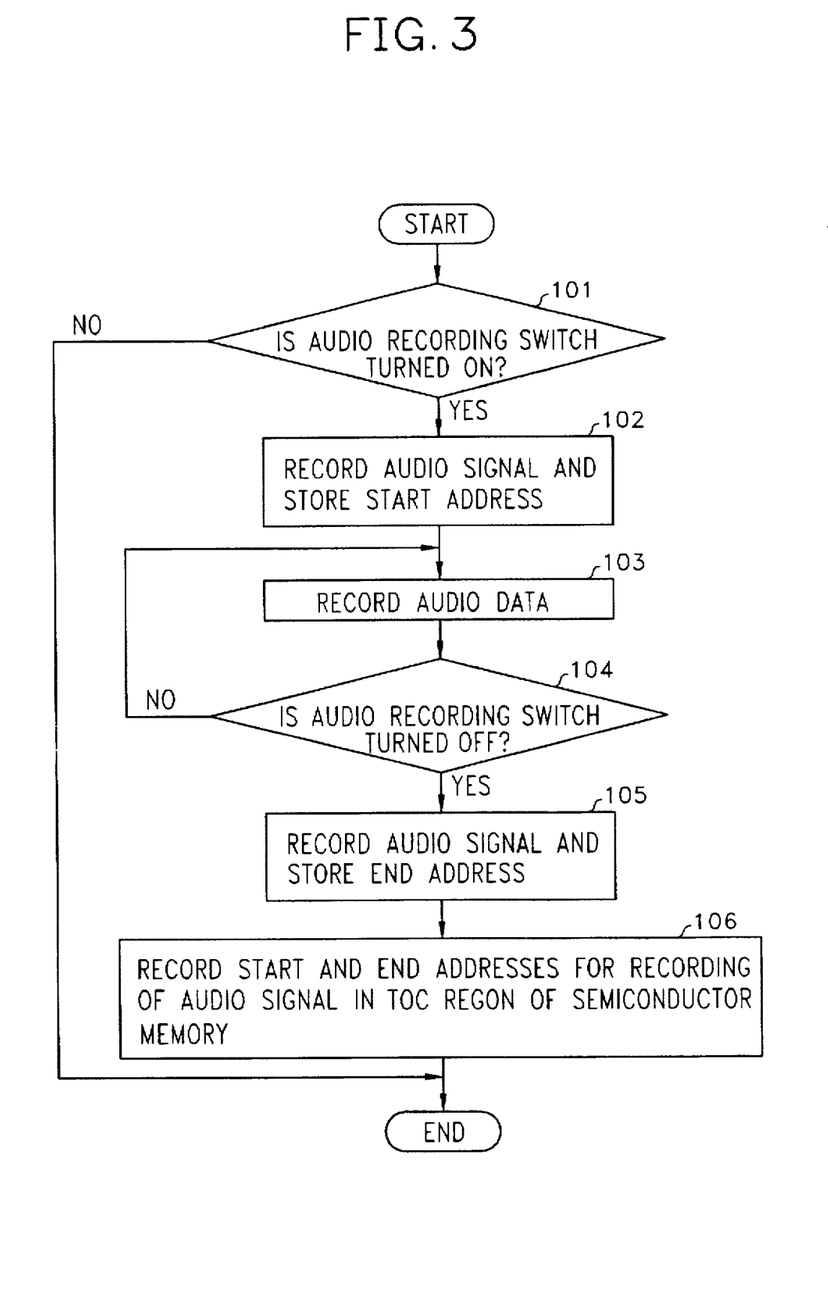
FIG. 3 is a flowchart diagram for explaining a procedure of recording an audio signal in FIG. 1.

Referring to FIG. 3 showing a flowchart of audio information storage, system controller 17 judges whether an audio recording switch 181 in switch portion 180 is turned on in step 101. When audio recording switch 181 is turned on, system controller 17 stores an audio information start address of the audio information region in an internal memory within semiconductor memory 16 for storing the audio data in step 102. Then, system controller 17 controls buffer memory 15 and semiconductor memory 16 in step 103, to store in semiconductor memory 16 the audio data which is temporarily stored in buffer memory 15. System controller 17 judges whether audio recording switch 181 is turned off in step 104. System controller 17 controls semiconductor memory 16 to store the audio data until audio recording switch 181 is turned off. If audio recording switch 181 is turned off, system controller 17 performs step 105. In step 105, system controller 17 stores the audio information end address within the audio information region in the internal memory when the audio data storage is stopped. Then, system controller 17 stores the start and end addresses corresponding to the individual audio information stored in semiconductor memory 16, in the TOG region of semiconductor memory 16 in step 106. Such a procedure is repetitively performed within a limit of the residual audio information region in semiconductor memory 16 according to user manipulation of key input portion 18. Also, system controller 17 stores not only the audio information which has been described with reference to FIG. 3 but also the image information for one still image or successive moving images corresponding to the audio information, in semiconductor memory 16.

Figure 4:
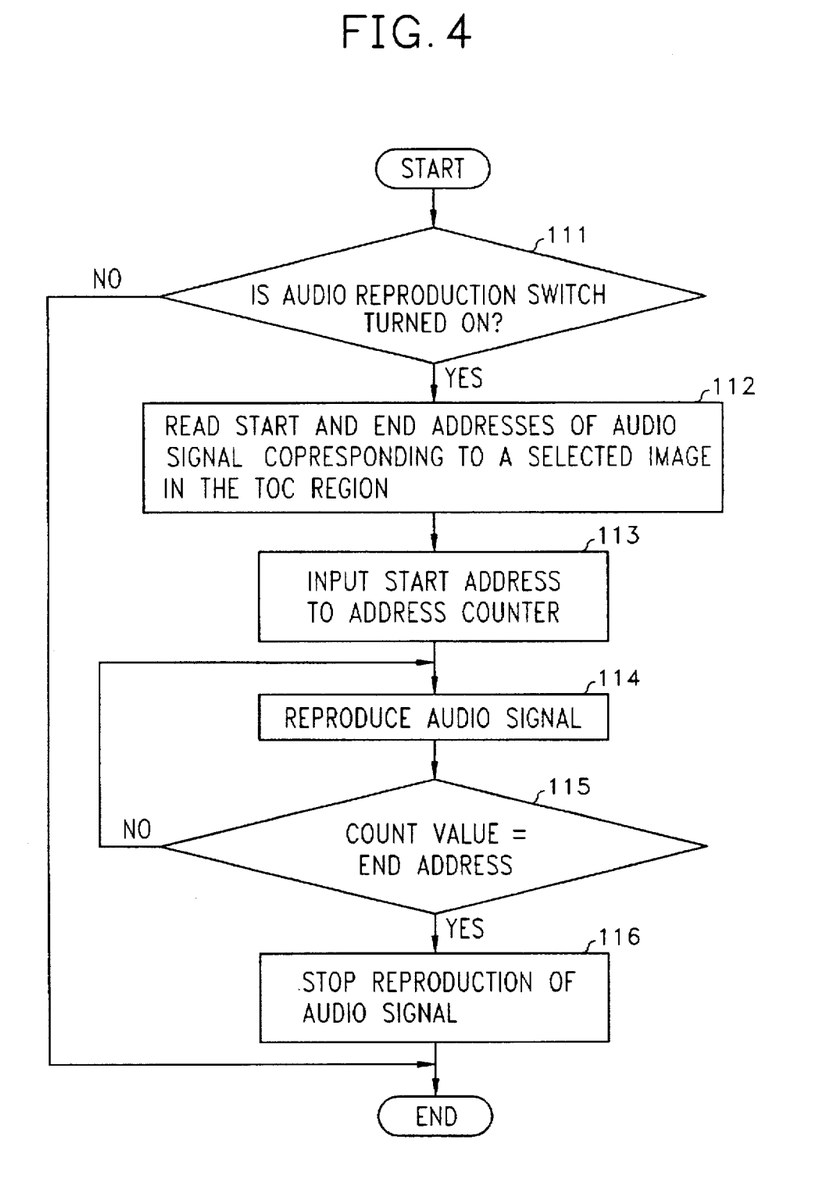
FIG. 4 is a flowchart diagram for explaining a procedure of reproducing an audio signal in FIG. 1.

Referring to FIG. 4 showing a procedure of reading the audio information corresponding to the selected image information for reproduction among the audio information stored in semiconductor memory 16, system controller 17 judges whether audio reproduction switch 183 of switch portion 18 is turned on in step 111. When audio reproduction switch 183 is turned on, system controller 17 reads out the start and end addresses of the audio information corresponding to the selected image information and stores the read start and end addresses in the internal memory in step 112. Then, system controller 17 supplies the read audio information start address to an internal address counter 171 in step 113. Address counter 171 counts the applied audio information start address and outputs a continuously increasing count value. System controller 17 reads the audio data stored in semiconductor memory 16 using a count value output from address counter 171 as a corresponding address of the audio region in step 114. The read audio data is supplied to second reproduction signal processor 21 via buffer memory 15. System controller 17 compares the counted value with the stored audio information end address in step 115. System controller 17 reads the audio data continuously from semiconductor memory 16 according to the count value output from address counter 17', until the count value equals the audio information end address value. If the count value equals the audio information end address value, system controller 17 performs step 116 to stop the reproduction operation of the audio data.

A procedure of checking and displaying a current residual memory capacity in semiconductor memory 16 attached to the FIG. 1 apparatus will be described below with reference to FIG. 5. To display a residual memory capacity of semiconductor memory 16, system controller 17 uses the TOG region of attached semiconductor memory 16 to check the entire memory capacity in step 121. Then, system controller 17 calculates the whole reproduction time corresponding to the entire memory capacity in step 122. The calculation of the whole reproduction time is accomplished on the basis of the data amount calculated by the number of the image information or the start and end addresses of the audio information both of which are stored in the TOC region. Preferably, the whole reproduction time is calculated on the basis of the data amount due to the start and end addresses of the audio information which is stored in the TOG region. For example, when semiconductor memory 16 has a capacity of eight megabytes, the corresponding whole reproduction time is one-hundred-fifty minutes. System controller 17 checks whether audio recording switch 181 and audio reproduction switch 183 are turned on and off in step 123 to determine whether a state of recording or reproducing the audio information is set or not. When there is an audio recording or reproducing state in step 123, system controller 17 calculates a current address which is used for recording or reproducing the current audio data and a current time corresponding to the current address on the basis of the audio information recording or reproducing state, in step 124. Then, system controller 17 subtracts the current time from the whole reproduction time to calculate a current residual memory capacity in step 125. System controller 17 supplies the calculated current residual memory capacity to first reproduction signal processor 19. In step 126, first reproduction signal processor 19 displays the received current residual memory capacity via display 20. Preferably, display 20 represents the current residual memory capacity in the form of time. System controller 17 checks whether the apparatus is in the key input state where the recording or reproduction will stop in step 127, and repetitively performs a signal procedure to display the current residual memory capacity until the recording or the reproduction is stopped.

As described above, the present invention records the individual audio information having a variable data amount corresponding to the individual image information on a region where a variable memory capacity is allocated in the semiconductor memory, to optimize a recording process of the audio information with respect to the semiconductor memory. The present invention enables the user to see the current residual memory capacity during recording or reproduction, to assist the user to use the apparatus more conveniently.

While only certain embodiments of the invention have been specifically described herein, it will apparent that numerous modifications may be made thereto without departing from the spirit and scope of the invention.

What is claimed is:

1. An image/audio information recording and reproducing apparatus, comprising:
    a semiconductor memory;
    a signal processing portion for processing image and audio information to enable the image and audio information to be recorded on and reproduced from said semiconductor memory; and
    control means, coupled between said semiconductor memory and said signal processing portion, for storing individual image information and individual audio information corresponding to the individual image information in said semiconductor memory and reading the stored image and audio information from said semiconductor memory, using a start address of the individual image information and both a start and an end address of the individual audio information.

2. An image/audio information recording and reproducing apparatus according to claim 1, wherein said semiconductor memory is a non-volatile memory.

3. An image/audio information recording and reproducing apparatus according to claim 1, wherein said semiconductor memory comprises a region for storing the image information, a region for storing the audio information, and a region for storing an image information start address, an audio information start address and an audio information end address corresponding to the individual image information.

4. An image/audio information recording and reproducing apparatus according to claim 3, wherein said semiconductor memory comprises a predetermined storage capacity for the image information region and the audio information region, respectively.

5. An image/audio information recording and reproducing apparatus according to claim 3, wherein said semiconductor memory is designed as an attachable or detachable integrated circuit card.

6. An image/audio information recording and reproducing apparatus according to claim 1, wherein said individual image information is a still image.

7. An image/audio information recording and reproducing apparatus according to claim 1, wherein said individual image information is successive moving images.

8. An image/audio information recording and reproducing apparatus according to claim 1, wherein said signal processing portion comprises a means for converting an optical signal representing the image information and an acoustic signal representing the audio information into respective electrical signals.

9. An image/audio information recording and reproducing apparatus according to claim 8, wherein said signal processing portion further comprises a means for reconverting the electrical signals representing the image and audio information back into the optical signal and the acoustic signal.

10. An image/audio information recording and reproducing apparatus, comprising:
    a semiconductor memory;
    a signal processing portion for processing image and audio information to enable the image and audio information to be recorded on and reproduced from said semiconductor memory; and
    control means, coupled between said semiconductor memory and said signal processing portion, for storing individual image information and individual audio information corresponding to the individual image information in said semiconductor memory and reading the stored image and audio information from said semiconductor memory, using a start address of the individual image information and both a start and an end address of the individual audio information, wherein said control means comprises a buffer memory for temporarily storing the information given and taken between said semiconductor memory and said signal processing portion;
    a user command input portion for instruction of the recording and reproduction of the audio information; and
    a controller for controlling said buffer memory and said semiconductor memory in response to the command of said user input portion.

11. An image/audio information recording and reproducing apparatus according to claim 10, wherein said control means determines the start address and the end address of the individual audio information which is stored in the semiconductor memory, on the basis of an amount of the audio data corresponding to one between a recording start command and a recording stop command according to a user's instruction.

12. An image/audio information recording and reproducing apparatus according to claim 10, wherein said controller further comprises an address counter for up-counting the individual audio information start address, wherein the stored audio information is continuously read out from said semiconductor memory until the end address of the individual audio information equals the count value of said address counter.

13. An image/audio information recording and reproducing apparatus according to claim 10, further comprising a display for displaying residual memory capacity, wherein said controller detects a residual data storage capacity for recording on the basis of a time interval corresponding to the whole audio data storage capacity of said semiconductor memory and a time corresponding to a current address which is used for storing the audio information in said semiconductor memory, and detects a residual data storage capacity for reproduction on the basis of a time interval corresponding to the whole audio data storage capacity of said semiconductor memory and a time corresponding to a current address which is used for reading the audio information from said semiconductor memory.

\* \* \* \* \*